United States Patent [19]
Potter

[11] Patent Number: 5,742,794
[45] Date of Patent: Apr. 21, 1998

[54] EMULATION TECHNIQUES FOR COMPUTER SYSTEMS HAVING MIXED PROCESSOR/SOFTWARE CONFIGURATIONS

[75] Inventor: Bruce Potter, Austin, Tex.

[73] Assignee: Dell USA, L.P., Austin, Tex.

[21] Appl. No.: 542,936

[22] Filed: Oct. 13, 1995

[51] Int. Cl.$^6$ .................................................. G06F 9/455
[52] U.S. Cl. ..................... 395/500; 364/363; 364/263.2; 364/280; 364/282; 364/DIG. 1
[58] Field of Search ................................... 395/500, 591, 395/568

[56] References Cited

U.S. PATENT DOCUMENTS

| | | | |
|---|---|---|---|
| 3,698,007 | 10/1972 | Malcolm et al. | 395/568 |
| 4,972,317 | 11/1990 | Buonomo et al. | 395/568 |
| 5,210,832 | 5/1993 | Maier et al. | 395/568 |
| 5,327,567 | 7/1994 | Johnson | 395/568 |
| 5,481,684 | 1/1996 | Richter et al. | 395/388 |
| 5,574,927 | 11/1996 | Scantlin | 395/800 |

*Primary Examiner*—Kevin J. Teska
*Assistant Examiner*—Ayni Mohamed
*Attorney, Agent, or Firm*—Haynes and Boone L.L.P.

[57] ABSTRACT

A computer system capable of processing a software application having at least one unrecognizable instruction and an associated method for emulating opcode instruction exceptions. The computer system includes a local bus, processor and memory subsystems coupled to the local bus, a system bus coupled to the local bus, and an opcode exception emulator coupled to the system bus. As the processor subsystem only recognizes a particular set of instructions, the opcode instruction emulator detects those instructions to be placed on the local bus which are not included in the recognizable set of instructions and locates corresponding recognizable emulation codes stored in the memory system for transfer to the processor subsystem in place thereof. Specifically, a plurality of potential opcode instruction exceptions for the processor subsystem are determined and an identifying code for each is stored in a memory portion of the opcode exception emulator while a corresponding emulation code is stored in the memory subsystem. Upon detection of the propagation of an instruction comprised of at least one byte of data to the processor subsystem, an identifying code for the detected instruction is compared to the identifying code for each one of the plurality of determined potential opcode instruction exceptions stored in the memory portion. If the identifying codes match, a determination is made that the detected instruction is an opcode instruction exception. The opcode exception emulator then points to the corresponding emulation code to be propagated to the processor subsystem for execution.

30 Claims, 3 Drawing Sheets

| INVALID OPCODE 1 | ADDRESS POINTER | SIZE OF EMULATION CODE | 42-1 |
| INVALID OPCODE 2 | ADDRESS POINTER | SIZE OF EMULATION CODE | 42-2 |
| INVALID OPCODE 3 | ADDRESS POINTER | SIZE OF EMULATION CODE | 42-3 |
| ... | ... | ... | |
| ... | ... | ... | |
| INVALID OPCODE N | ADDRESS POINTER | SIZE OF EMULATION CODE | 42-N |

EMULATION TECHNIQUES FOR COMPUTER SYSTEMS HAVING MIXED PROCESSOR/SOFTWARE CONFIGURATIONS

BACKGROUND OF THE INVENTION

1. Field of the Invention

The present invention generally relates to emulation techniques for computer systems and, more particularly, to a computer system having emulation circuitry which replaces invalid instructions with code interpretable by the processor.

2. Description of Related Art

In recent years, computer systems such as the personal computer (or "PC") have undergone nearly continuous improvements as the various manufacturers seek to obtain technical advantages which would lead to an increased market share. Much of this attention has been focussed around the processor. Due to continuing development of new processors and their immediate incorporation into commercially available computers, there are a wide array of processors which may be found in any individual computer system. For example, a single model of an IBM-compatible PC may have an Intel 286 processor if manufactured in 1992, a 386 if manufactured in 1993, a 486 if manufactured in 1994 and a Pentium if manufactured in 1995. Computer systems that use other processors, for example, the DEC Alpha, Motorola Power PC or HP RISC, have similarly experienced rapid upgrades.

While compatibility problems between computers having different architectures have long been recognized, these repeated processor upgrades have resulted in various compatibility problems for computers which share a common architecture. For example, different versions of a software application may need to be written for different ones of processors of a single processor family. One such compatibility problem is generally known as "backward compatibility". Software is considered to be backward compatible if, while written for the most recent generation of processors, the software will still run on the prior generation processor. A recent example of a backward compatibility problem has arisen with respect to the Intel Pentium processor. Specifically, the Pentium has been provided with a unique set of instructions which were never provided to other Intel processors, for example, the 486. If a software application uses any of the instructions contained in this set, that application will only run on the Pentium and not on any other Intel or other IBM-compatible processor.

Nor are backward compatibility problems unique to the Intel family of processors. The same is true for all RISC-like processors, for example, the DEC Alpha, when faced with newer processors having new instruction sets. One proposed solution to this problem involves the use of software emulation. For example, the Motorola Power PC will be unable to run X86 binary code unless its operating system traps on non-binary incompatible code and emulates that code through routines which duplicate and handle all of their functions as well as their architectural dependencies. The problem with software emulation is that such techniques have a significant amount of associated overhead which degrades the overall performance of the processor as well as not having the operating system (or "OS") support to emulate instruction sets for future processors.

The aforementioned limitations also place handicaps on the software industry. To achieve widespread acceptance in the marketplace, a software application must be compatible with most, if not all, of the leading processors used in computers. Thus, a software developer must prepare several versions of a single software application, one for each computer architecture and/or processor family having a unique set of instructions. As a result thereof, the cost of developing new software has remained relatively high. Furthermore, new software applications are often unable to take advantage of improvements in processor technology. For example, if the Pentium includes new instructions which allow certain functions to be performed more efficiently, a software developer cannot take advantage of this improvement without writing two versions of the application, one for the Pentium and a second for the older X86 processors.

Nor are these handicaps limited to the software industry. Processor designers themselves are often handicapped by these same limitations. Many processor designers are interested in designing processors that are compatible with processors manufactured by their competitors. Accordingly, processors are often designed to handle instructions written for a competitor's processor. However, if that competitor adds additional instructions, for example, when designing a new generation of processors, the processor designer will find that their processor is no longer fully compatible with their competitor's new generation of processors. Furthermore, even if the processor designer intends for a processor to be compatible with an existing design offered by a competitor, it is not possible to achieve compatibility if the competitor's design includes presently unpublished instruction sets. For example Intel's Pentium includes an instruction set, commonly known as "Appendix H", which is presently unpublished but which may become publicly known in the near future. However, until this instruction set is released or otherwise becomes general knowledge, there is no way for a competitor to market a processor which is capable of recognizing the unpublished instructions.

Finally, the inability to design a computer system in which the processor will never be able to recognize instructions developed at a later date severely limits one's ability to debug a processor. For example, if a existing instruction causes a processing error, this bug could be easily corrected if the computer system could replace that instruction with emulation code which does not cause the processing error.

It can be readily seen from the foregoing that it would be desirable to provide a computer system which, by virtue of its ability to selectively substitute emulation code for unrecognizable instructions, enables its processor to handle a wider array of instructions than the original instruction set associated with the processor at its time of manufacture, thereby providing a computer system which permits mixed processor and/or software configurations. It is, therefore, the object of this invention to provide such a computer system.

SUMMARY OF THE INVENTION

In one embodiment, the present invention is of a computer system which includes a processor subsystem configured to recognize a first set of instructions and means, such as an operating system, for propagating software applications to the processor subsystem for execution. The computer system further includes a circuit which, if a software application comprised of a series of instructions which includes at least one instruction which cannot be recognized by the processor subsystem is propagated to the processor subsystem for execution, propagates emulation code, recognizable by the processor subsystem, in place of the unrecognizable instructions. The emulation code is stored in a first memory device, such as the main memory for the computer system, coupled to the processor subsystem.

In one aspect of this embodiment of the invention, the circuit may further include a second memory device in which first, second and third blocks of data are stored for each of the unrecognizable instructions. Each of the first data blocks uniquely identifies an unrecognizable instruction, each of the second data blocks provides a location within the first memory device where a corresponding emulation code is located and each of the third data blocks provides a data length for the corresponding emulation code. In another aspect, the circuit further includes a comparator, coupled to the second memory device, for comparing at least one of the series of instructions which comprises the software application with each of the first data blocks. If one of the series of instructions matches one of the first data blocks, the circuit will propagate a portion of the emulation code stored in the first memory device to the processor subsystem. The portion of the emulation code propagated to the processor subsystem will have a starting address and a length which are respectively contained in the second and third data blocks which correspond to the matching first data block.

In another aspect thereof, the computer system further includes means for determining when the processor subsystem is ready to receive the series of instruction from the software application and means for comparing a first one of the series of instructions, which may be a CPUID instruction, to the first data blocks stored in the second memory device. The computer system may also include a first, normally enabled, data path which couples the software application and the processor subsystem, a second, normally disabled, data path which couples the first memory device with the processor subsystem and means for disabling the first data path and enabling the second data path if the first one of the series of instructions matches one of the first data blocks.

In another embodiment, the present invention is of a method for emulating opcode instruction exceptions propagated to a processor subsystem of a computer system. The propagation of an instruction to the processor subsystem is detected. If it is determined that the instruction is an opcode instruction exception, an emulation code which corresponds to the detected opcode instruction exception is identified and the identified emulation code is propagated to the processor subsystem for execution. In one aspect thereof, the instruction may be determined to be an opcode instruction exception by comparing an identifying code for the detected instruction to the respective identifying codes for a plurality of potential opcode instruction exceptions. If the identifying code for the detected instruction matches the identifying codes for one of the potential opcode instruction exceptions, the detected instruction is determined to be an opcode instruction exception.

In another aspect of this embodiment of the invention, a plurality of potential opcode instruction exceptions for the processor subsystem are identified and an identifying code for each one of these potential opcode instruction exceptions is stored in memory. An identifying code for the detected instruction may then be compared to the identifying code for each one of the plurality of identified potential opcode instruction exceptions and a detected instruction determined to be an opcode instruction exception if the identifying code for the detected instruction matches the identifying code for one of the plurality of potential opcode instruction exceptions. In one aspect thereof, the identifying code for the detected instruction is a header portion of the detected instruction and, more particularly, may be a CPUID instruction.

In another aspect of this embodiment of the invention, a first, normally enabled, data path along which instructions are propagated to the processor subsystem and a second, normally disabled, data path along which emulation codes are propagated to the processor are provided. In this aspect, the first data path may be disabled and the second data path enabled upon determining that the detected instruction is an opcode instruction. The identified emulation code may then be propagated to the processor subsystem along the second data path.

In yet another embodiment, the present invention is of a method for emulating opcode instruction exceptions propagated to a processor subsystem in which a plurality of potential opcode instruction exceptions for the processor subsystem are determined and an identifying code for each one of the determined potential opcode instruction exceptions is stored at a first location and an emulation code for each one of the plurality of determined opcode instruction exceptions is stored at a second location. Upon detection of the propagation of an instruction comprised of at least one byte of data to the processor subsystem, an identifying code for the detected instruction is compared to the identifying code for each one of the plurality of determined potential opcode instruction exceptions stored at the first location. If the identifying code for the detected instruction matches the identifying code for one of the plurality of determined potential opcode instruction exceptions stored at the first location, it is determined that the detected instruction is an opcode instruction exception. The emulation code which corresponds to the detected opcode instruction exception is first identified and then propagated to the processor subsystem for execution.

In one aspect thereof, at least one output line of the processor subsystem is monitored and, based upon the state of the at least one output line, a determination is made that the processor subsystem is to receive an instruction. Upon making this determination, a first byte of the detected instruction is compared to the identifying code for each one of the plurality of determined potential opcode instruction exceptions. In another aspect thereof, a first, normally enabled, data path along which instructions are propagated to the processor subsystem and a second, normally disabled, data path along which emulation codes are propagated to the processor subsystem are provided. The first data path is then disabled and the second data path enabled if the first byte of the detected instruction matches the identifying code for one of the plurality of determined potential opcode instruction exceptions. However, if the first byte of the detected instruction fails to match the identifying code for one of the plurality of determined potential opcode instruction exceptions, the first data path remains enabled and the second data path remains disabled.

In another aspect thereof, an address and a byte size for each one of the plurality of determined potential opcode instruction exceptions are further stored at the first location and, in a related aspect thereof, the address is used to point to a first byte of the identified emulation code for propagation to the processor subsystem. The byte size is then decremented by one and the steps of pointing to a next byte of the identified emulation code, propagating the next byte of the identified emulation code to the processor subsystem and decrementing the byte size by one are repeated until the byte size is decremented to zero. The processor subsystem is then informed that the propagation of the identified emulation code is complete. In yet another related aspect thereof, the first data path is enabled and the second data path is disabled upon decrementing the byte size to zero.

In still another embodiment, the present invention is of a computer system capable of processing a software application having at least one unrecognizable instruction. The computer system includes a local bus, processor and memory subsystems coupled to the local bus, a system bus coupled to the local bus, and an opcode exception emulator coupled to the system bus. As the processor subsystem is only capable of recognizing a particular set of instructions, the opcode instruction emulator detects those instructions to be placed on the local bus which are not included in the set of instructions which can be recognized by the processor and locates corresponding emulation codes, recognizable by the processor subsystem, stored in the memory subsystem for transfer to the processor subsystem in place of the detected instructions. In one aspect thereof, the opcode exception emulator includes memory means for storing a plurality of instructions not included in the set of instructions and a comparator circuit, coupled to the memory means, for comparing instructions to be placed on the local bus with the plurality of instructions stored in the memory means. The comparator circuit determines that an instruction to be placed on the local bus is not recognizable by the processor subsystem if the instruction matches one of the plurality of instructions stored in the memory means.

In another aspect of this embodiment, the computer system further includes a first, normally enabled, buffer which couples the system bus to the local bus, a second buffer which couples the system bus to the opcode exception emulator and a third, normally disabled, buffer which couples the memory device to the local bus. In yet another aspect, the opcode exception emulator further includes a controller circuit, coupled to the comparator circuit, the first buffer and the third buffer. The controller circuit disables the first buffer and enables the third buffer upon a determination by the comparator circuit that the instruction to be placed on the local bus is not recognizable by the processor subsystem. The opcode exception emulator may also include pointing means for pointing to an emulation code stored in the memory subsystem for propagation to the processor subsystem. The emulation code pointed thereto corresponds to the instruction determined by the comparator circuit as not recognizable by the processor subsystem.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1:
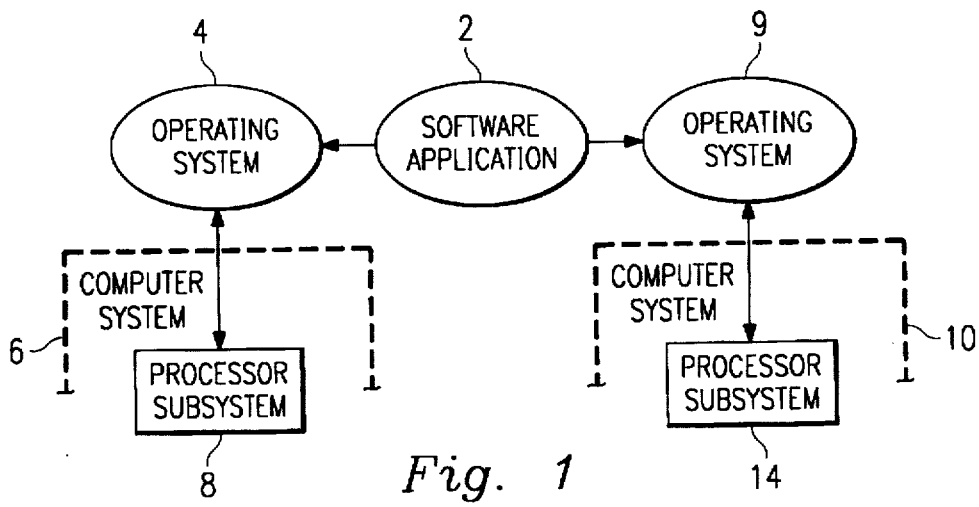
FIG. 1 is a block diagram of a computing environment in which a software application is executable by plural computer systems, including a computer system which handles mixed processor/software configuration.

Referring first to FIG. 1, a computing environment in which a software application 2 is executable by first and second computer systems 6 and 10 will now be described in greater detail. The software application 2 is comprised of a sequence of operational code (or "opcode") instructions which, when executed by a processor capable of recognizing the instructions, will perform a desired operation. Operating system 4 controls the propagation of the software application 2 to processor subsystem 8 of the first computer system 6. The software application 2 and the processor subsystem 8 have matching configurations, i.e., each of the opcode instructions which comprise the software application 2 are contained in the set of opcode instructions recognizable by the processor subsystem 8.

Similarly, operating system 9 controls the propagation of the software application 2 to processor subsystem 14 of the second computer system 10. The software application 2 and the processor subsystem 8 have mixed configurations, i.e., one or more of the opcode instructions which comprise the software application 2 are not included in the set of opcode instructions recognizable by the processor subsystem 14. Normally, such instructions, hereafter referred to as opcode instruction exceptions, cannot be executed by the processor subsystem 14 and would cause the processor subsystem 14 to issue an error message. However, the computer system 10 further includes a circuit, herein identified as an opcode exception emulator, which replaces opcode instruction exceptions with emulation code comprised of selected opcode instructions which are included in the set of opcode instructions recognizable by the processor subsystem 14. In this manner, the processor subsystem 14 is able to successfully execute the software application 2.

Figure 2:
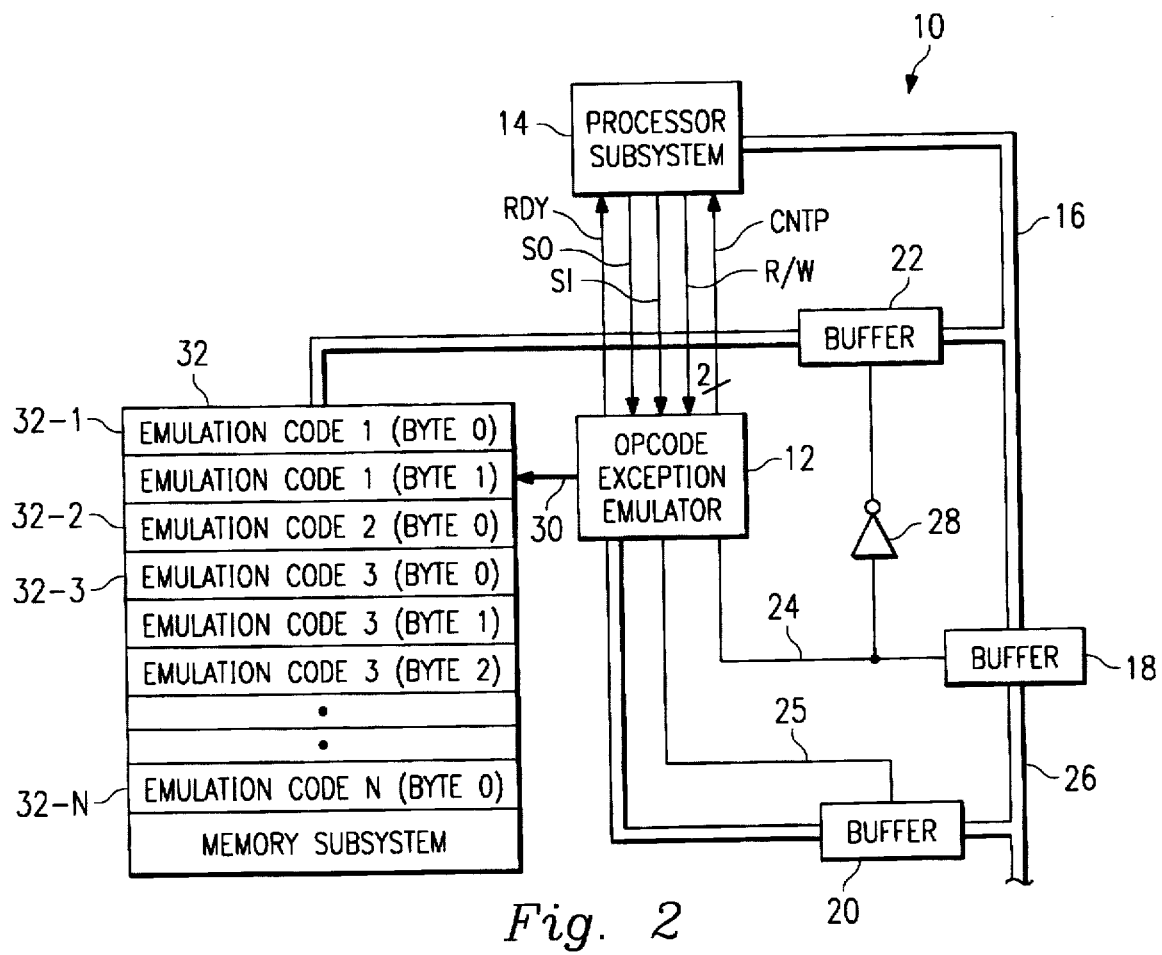
FIG. 2 is a block diagram of a computer system having an opcode exception emulator constructed in accordance with the teachings of the present invention to handle mixed processor/software configurations.

Referring now to FIG. 2, the second computer system 10 which includes an opcode exception emulator 12 constructed in accordance with the teachings of the present invention will now be described in greater detail. The processor subsystem 14 of the computer system 10 is of conventional design. For example, a type P6 Pentium processor manufactured by Intel Corporation of Santa Clara, Calif. would be suitable for the uses contemplated herein. The computer system 10 further includes a local bus 16 for bi-directional exchanges of address, data and control signals between the processor subsystem 14 and various components of the computer system 10 which reside on the local bus 16, for example, the main memory of the computer system 10. While omitted from FIG. 2 for ease of illustration, it should be clearly understood that it is specifically contemplated that additional devices also reside on the local bus 16. Typically, these devices will include a memory controller for controlling exchanges between the processor subsystem 14 and the main memory, a cache which holds data and instructions obtained from main storage for next use by the processor subsystem 14 and a system controller which controls exchanges of messages between devices residing on the local bus 16, for example, the processor Subsystem 14, and devices residing on a system bus 26 coupled to the local bus 16.

The computer system 10 further includes a first buffer 18 which couples the system bus 26 and the local bus 16, a second buffer 18 which couples the system bus 26 and the opcode exception emulator 12 and a third buffer 22 which couples a memory subsystem 32 with the local bus 16. The first and third buffers 18 and 22 may be selectively enabled by the opcode exception emulator 12. More specifically, the first and third buffers 18 and 22 respectively include an enable input coupled to a single control input line 24. During normal operations, i.e., whenever the opcode exception emulator 12 has not initiated a compare cycle to be more fully described below, messages transferred to and/or from the processor subsystem 14 would first be placed in the buffer 18 and then transferred to its final destination. Accordingly, the buffer 18 is normally enabled, for example, by the opcode exception emulator 12 driving the control input line 24 high. Furthermore, as an inverter 28 is positioned between the control input line 24 and the third buffer 22, the third buffer 22 will be disabled whenever the first buffer 18 is enabled and enabled when the first buffer 18 is disabled. Thus, in the event that an interruption of normal operations is required, i.e., by the initiation of an emulation operation during which the memory subsystem 32 is to supply the processor subsystem 14 with emulation code, the opcode exception emulator 12 drives the control input line 24 low, thereby enabling the third buffer 22 while simultaneously disabling the first buffer 18.

As is conventional in the art, the computer system 10 includes plural control lines, including the S0, S1 and R/W output lines illustrated in FIG. 2, coupled to the processor subsystem 14. However, unlike prior computer systems, in the novel computer system 10 disclosed herein, the S0, S1 and R/W output lines are coupled between the processor subsystem 14 and the opcode exception emulator 12 where, based on the respective states of the S0, S1 and R/W output lines, the opcode exception emulator 12 determines that the processor subsystem 14 is to receive an instruction from the system bus 26.

Also coupled between the opcode exception emulator 12 and the processor subsystem 14 are READY (or "RDY") and CONTROLLER (or "CNTR") lines. The RDY line is used by the opcode exception emulator 12 to notify the processor subsystem 14 that, based upon the state of the S0, S1 and R/W output lines, the processor subsystem 14 is ready to receive an instruction. The CNTR lines, more specifically the controller lines CNTR0 and CNTR1, on the other hand, notify the processor subsystem 14 as to the origination point of incoming instructions.

As will be more fully described below, for each opcode instruction exception detected by the opcode exception emulator 12, the memory subsystem 32 provides an emulation code to the processor subsystem 14 in its place. Preferably, the emulation code is held in a designated area of the main memory of the computer system 10. However, it is specifically contemplated that, if desired, a separate memory device may be used as the memory subsystem 32. The memory subsystem 32 may hold N emulation codes, each having a particular byte size. For example, the size of emulation codes 32-1, 32-2, 32-3 and 32-N may be two, one, three and one bytes, respectively.

Upon detecting the propagation of an opcode instruction exception towards the processor subsystem 14, the opcode exception emulator 12 determines a starting address and byte size count for a corresponding emulation code. The opcode exception emulator 12 then points to the first byte of the corresponding emulation code stored in the memory subsystem 32. The identified byte of emulation code is transmitted to the processor subsystem 14 in place of the opcode instruction exception and the byte size count decremented. The opcode exception emulator 12 successively identifies each byte of the corresponding emulation code for transmission to the processor subsystem 14 until the byte size count is decremented to zero, thereby indicating that the entire emulation code which corresponds to the opcode instruction exception has been transferred to the processor subsystem 14.

Figures 3, 4:
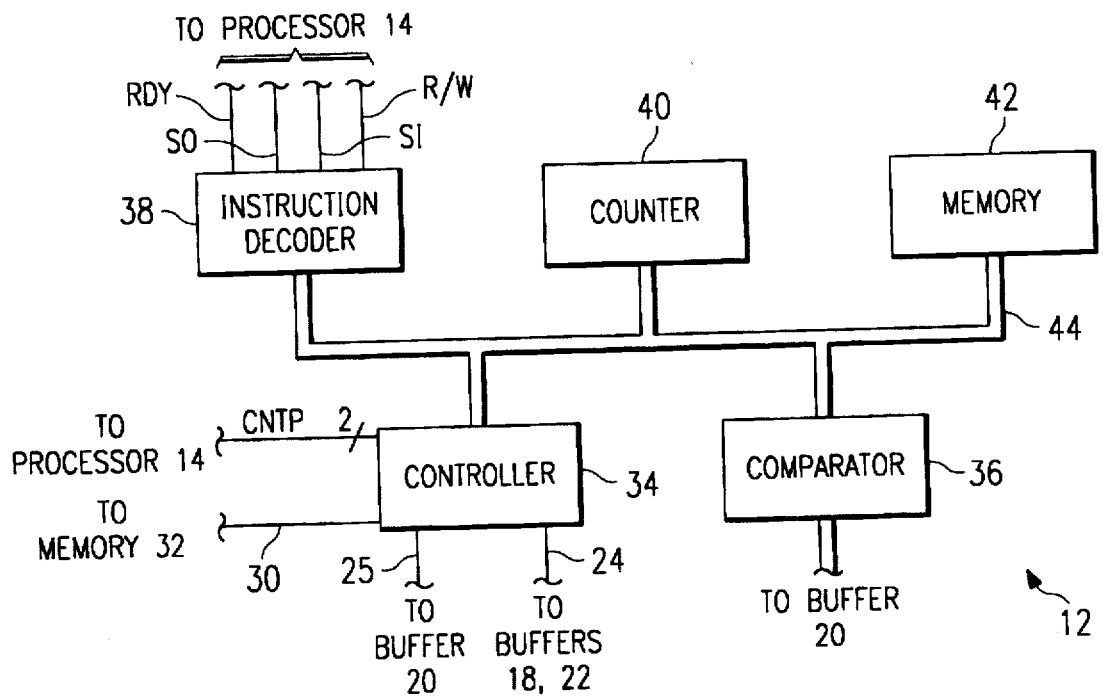
FIG. 3 is a block diagram of the opcode exception emulator of FIG. 2.
FIG. 4 is a block diagram of the data stored in the memory portion of the opcode exception emulator of FIG. 3.

Referring next to FIG. 3, the configuration of the opcode exception emulator 12 will now be described in greater detail. As may now be seen, the opcode exception emulator 12 is comprised of a controller 34, a comparator 36, an instruction decoder 38, a counter 40 and a local memory 42, all of which are interconnected with each other, for example, using a local bus 44 or other conventional interconnection means. As may now be seen, the controller 34 may selectively enable the first and third buffers 18 and 22 (while simultaneously disabling the third and first buffers 22 and 18) by respectively asserting or deasserting the control line 24, control the propagation of an opcode instruction from the second buffer 20 to the comparator 36 by asserting the control line 25, initiate the propagation of a selected byte of emulation code by pointing to the selected byte using the pointer 30, inform the processor subsystem 14 to expect an opcode instruction from the first buffer 18 by asserting the CNTR-0 line and inform the processor subsystem to expect emulation code from the third buffer 22 by asserting the CNTR-0 line.

As may be further seen in FIG. 3, the comparator 36 is coupled to the second buffer 20 to receive opcode instructions therefrom and the S0, S1, R/W and RDY lines couple the instruction decoder 38 with the processor subsystem 14 such that the instruction decoder 38 may determine when the processor subsystem 14 is ready to receive opcode instructions via the bus 16.

Referring now to FIG. 4, stored at discrete locations within the memory 42 is identifying information for a series of opcode instruction exceptions, i.e., invalid opcode instructions which are not interpretable by the processor subsystem 14 and for which emulation code is to be provided. For example, identifying information for invalid opcode 1 is stored at location 42-1, identifying information for invalid opcode 2 is stored at location 42-2, identifying information for invalid opcode 3 is stored at location 42-3 and identifying information for invalid opcode N is stored at location 42-N. The identifying information for each invalid opcode is comprised of three portions. The first portion contain a code which uniquely identifies the invalid opcode, the second portion contains a starting address where a corresponding emulation code is stored in the memory subsystem 32 and the third portion provides the size, in bytes, of the emulation code. The aforedescribed identifying information for each opcode instruction exception to be emulated by the opcode exception emulator 12 is stored in the memory 42, preferably using a write operation during initialization of the opcode exception emulator 12. For each opcode instruction exception stored in the memory 42, a corresponding emulation code having the specified starting address and byte size should be stored in the memory subsystem 32, again preferably using a write operation during initialization of the opcode exception emulator 12.

It should be noted that the particular opcode instruction exceptions for which emulation code is to be provided will vary, depending on the particular processor involved and the specific backward compatibility or other problem for which correction is sought. For example, if backward compatibility of an Intel 486 type processor such that an instruction set unique to the Intel Pentium is to be recognizable by the 486 type processor, thereby enabling software applications which use instructions from the aforementioned instruction set may run on the 486 type processor, a code which uniquely identifies each of the Pentium specific instructions is placed in the first portion of the identifying information stored at each location 42-1 through 42-N of the memory 42. For example, each instruction included in the instruction set for the Pentium includes a CPUID instruction as its header. Accordingly, for this example, the CPUID for each opcode instruction exception is placed in the first portion of the identifying information stored at locations 42-1 through 42-N of the memory 42. In addition, for each opcode instruction exception, an emulation code, i.e., opcode which performs the same task as the opcode instruction exception but which is recognizable by the processor subsystem 14, is stored at a specific location in the memory subsystem 32.

Figure 5:
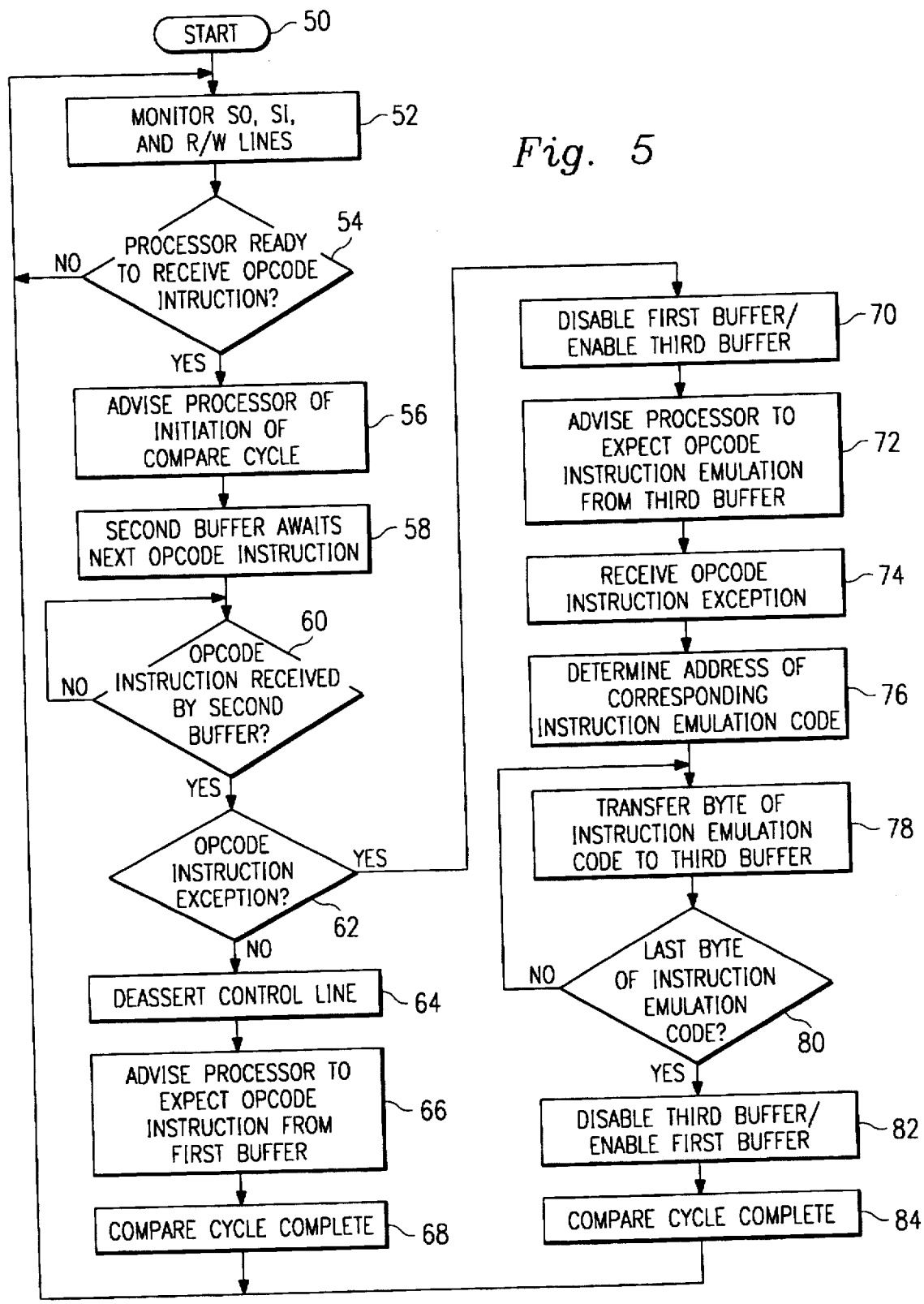
FIG. 5 is a flow chart of a method by which the opcode exception emulator of FIGS. 2–3 substitutes emulated code for opcode instruction exceptions.

Referring now to FIG. 5, the method by which the opcode exception emulator 12 detects exception in the instructions being transmitted to the processor subsystem 14 and substitutes emulation code for the detected exceptions shall now be described in greater detail. The method commences at step 50 by activating the previously initialized opcode exception emulator 12, for example, by powering up the computer system 10. Proceeding to step 52, the instruction decoder 38 begins to monitor the S0, S1 and R/W lines. As is well known in the art, by monitoring these lines, the instruction decoder 38 can determine when the processor subsystem 14 is ready to receive an opcode instruction.

Continuing on to step 54, if the instruction decoder 38 determines, based upon the states of the S0, S1 and R/W output lines, that the processor subsystem 14 is expecting an instruction, the method proceeds to step 56 where the instruction decoder 38 initiates a compare instruction cycle by advising the processor subsystem 14 that it is ready to receive opcode instructions from the bus 16. If, however, the instruction decoder 38 determines, based upon the states of the S0, S1 and R/W output lines, that the processor subsystem 14 is not expecting an instruction, the method returns to step 52 where the instruction decoder 38 continues to monitor the S0, S1 and R/W output lines.

Returning now to step 56, if the instruction decoder 38 had determined that the processor subsystem 14 is ready to receive an opcode instruction, the instruction decoder 38 advises the processor subsystem 14 of the initiation of a compare instruction cycle by asserting the RDY line. The instruction decoder 38 also advises the controller 34 that a compare instruction cycle has been initiated via bus 44. In turn, the controller 34 instructs the second buffer 20 to propagate, to the comparator 36, the next opcode instruction received from the system bus 26 by asserting the control line 25. The method of the present invention then proceeds to step 58 where the second buffer 20 awaits the arrival of the next opcode instruction being propagated to the processor subsystem 14 by a device (not shown) coupled to the system bus 26.

It should be noted that the first buffer 18 and the second buffer 20 are respectively coupled to the system bus 26. Accordingly, an instruction placed on the system bus 26 for transfer to the processor subsystem 14 is received by both the first buffer 18 and the second buffer 20. During normal operations, however, the contents of the first buffer 18 are transferred to the processor subsystem 14 while the contents of the second buffer 20 are discarded, for example, by overwriting the contents of the second buffer 20 during a next instruction transfer.

Furthermore, while it is specifically contemplated that, in alternate embodiments of the invention, any opcode instruction may be analyzed for validity by the opcode instruction emulator 12, in the embodiment of the invention disclosed herein, the opcode instruction being transmitted is an instruction included in the instruction set corresponding to the Intel Pentium processor and the particular instruction to be analyzed is the CPUID instruction which heads any instruction transmitted to a Pentium processor by a software application. For other processors, it is contemplated that the opcode instruction emulator 12 may perform a similar analysis of a header or other suitable portion of a transmitted instruction. If the portion of the instruction to be analyzed by the opcode instruction emulator 12 before the instruction is received by the processor subsystem 14 is other than a header portion, i.e., an intermediate or end portion, it may be necessary to provide additional buffers to hold preceding portions of the instruction during the analysis thereof.

Proceeding to step 60, the second buffer 20 awaits receipt of the CPUID instruction. Upon placement of the CPUID instruction in the second buffer 20, the instruction is transmitted to the comparator 36 where it is compared to a series of CPUID instructions previously placed in the first portions of the identifying information stored at locations 42-1 through 42-N of the memory 42. If it is determined at step 62 that the receive CPUID instruction matches one of the CPUID instructions stored in the memory 42, then the controller 34 concludes that the opcode instruction being transmitted to the processor subsystem 14 is an opcode instruction exception which contains one or more instructions which cannot be properly interpreted by the processor subsystem 14. Accordingly, the method of the present invention would proceed to step 70 to initiate an opcode exception emulation process.

If, however, the receive CPUID instruction fails to match one of the CPUID instructions stored in the memory 42, the controller 34 concludes that the opcode instruction being transmitted to the processor subsystem 14 is a valid instruction that is interpretable by the processor subsystem 14 and, continuing on to step 64, the controller 34 deasserts the control line 25 so that the opcode instructions which follow the CPUID instruction are not propagated to the comparator 36. Proceeding on to step 66, the controller 34 informs the processor subsystem 14 to expect a valid instruction from the first buffer 18, for example, by asserting the CNTR-0 line. The processor subsystem 14 then receives the valid instruction from the first buffer 18, thereby completing the compare instruction cycle at step 68.

Returning now to step 62, if the controller 34 concludes that the opcode instruction being transmitted to the processor subsystem 14 is an opcode instruction exception which contains one or more instructions which cannot be properly interpreted by the processor subsystem 14, the method of the present invention proceeds to step 70 where the controller 24 simultaneously disables the first buffer 18, thereby preventing transmission of the detected opcode instruction exception to the processor subsystem 14, and enables the third buffer 22, thereby permitting transmission of emulation code to the processor subsystem 14, by deasserting the control line 24.

Proceeding to step 72, the controller 34 advises the processor subsystem 14 to expect opcode instruction emulation code from the third buffer 22, for example, by asserting the CNTR-1 line and, at step 74, the opcode exception emulator 12 begins to receive the opcode instruction exception. Specifically, each portion of the opcode instruction placed in the buffer 20 is transmitted to the comparator 34. The comparator 34 searches the first portions of the identifying information stored at locations 42-1 through 42-N of the memory 42 for a match and, upon identifying a match, transmits the identifying information stored at that location to the controller 34. As previously discussed, the identifying information for an invalid opcode instruction includes a starting address for the corresponding emulation code stored in the memory subsystem 32 and the size, in bytes, of the corresponding emulation code.

Accordingly, at step 76, the controller 34 determines the address of the corresponding instruction emulation code by reviewing the second portion of the identifying information provided thereto and, proceeding to step 78, initiates the transmission of emulation code to the processor subsystem 14 by pointing to the byte of emulation code located at the starting address using the pointer 30. The byte of emulation code identified by the pointer 30 is then placed in the third buffer 22 for subsequent propagation to the processor subsystem 14. The byte size count of the emulation code provided to the controller 34 is then decremented by one and, at step 80, the controller 34 determines whether the entire emulation code corresponding to the identified opcode instruction exception has been propagated to the processor subsystem 14 via the third buffer 22 by determining whether the byte size count has been decremented to zero. If the byte count is greater than zero, the method returns to step 78 where the controller 34 points to the next byte of emulation code stored in the memory subsystem 32 for transmission to the third buffer 22. This process of pointing to a byte of emulation code for transmission to the third buffer 22 and decrementing the byte size count by one continues until the byte size count reaches zero.

Returning now to step 80, once the byte size count reaches zero, the controller 34 has determined that the emulation code corresponding to the identified opcode instruction exception has been propagated to the processor subsystem 14. The method then proceeds to step 82 where the controller simultaneously enables the first buffer 18 and disables the third buffer 22 by asserting the control line 24, thereby completing the compare instruction cycle at step 84 by permitting the processor subsystem 14 to receive instructions or other messages originating along the system bus 26.

In the embodiment of the invention disclosed herein, the compare instruction cycle includes the steps of comparing a first, header portion, for example, the CPUID instruction, for each opcode instruction to be transmitted to the processor subsystem 14 to identifying information stored in the memory 42, propagating each subsequent portion of the opcode instruction to the comparator 36, again for comparison to the identifying information stored in the memory 42 if the header portion matches the identifying information for an opcode instruction exception, identifying a corresponding portion of the emulation code for each portion of the opcode instruction exception propagated to the comparator 36, propagating the corresponding portions of the emulation code to the processor subsystem 14 in place of the portions of the opcode instruction transmitted to the comparator 36 or propagating the opcode instruction to the processor subsystem 14 if the header portion fails to match identifying information for an opcode exception stored in the memory 42.

While suitable for the uses contemplated herein, the comparison of each portion of the opcode instruction exception to the identifying information stored in the memory 42 may produce an undesirable amount of additional overhead. Accordingly, in an alternate embodiment of the invention, the opcode exception emulator 12 is configured such that only the header portion of each opcode instruction is compared to the identifying information stored in the memory 42. In this embodiment of the invention, once the header portion of the opcode instruction is identified as an opcode instruction exception, the remainder of the opcode instruction exception would be discarded. In this embodiment, the starting address and byte size for each opcode instruction exception would be selected such that the entire emulation code, rather than a single portion thereof, could be identified thereby. By reducing the number of compare operations performed by the comparator 36, it is expected that the overhead produced by the opcode instruction emulator 12 would be reduced substantially.

Thus, there has been described and illustrated herein, a computer system having a limited degree of processor independence in view of its capability of executing a broader array of software applications than those permitted by its processor. Such an improvement has been achieved by the inclusion, in the computer system, of an opcode emulation circuit capable of replacing instructions which are unrecognizable by the processor thereof with interpretable emulation code, thereby enabling the processor to execute various software applications which otherwise could not run on the computer system. The disclosed techniques are particularly suitable for eliminating backwards compatibility problems resulting when software applications are written which include instructions interpretable by the current generation of processors but not by prior generations of processors. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A computer system, comprising:

a processor subsystem configured to recognize a first set of instructions;

a software application comprised of a series of instructions, said series of instructions including at least one instruction which cannot be recognized by said processor subsystem;

means for propagating said series of instructions comprising said software application to said processor subsystem for execution; and a circuit, coupled to said processor subsystem, for detecting propagation of said series of instructions towards said processor subsystem, determining that said at least one instruction is an opcode instruction exception, preventing arrival of said at least one instruction at said processor subsystem and propagating emulation code, recognizable by said processor subsystem, in place of said at least one instruction.

2. A computer system according to claim 1 wherein said means for propagating said series of instructions to said processor subsystem is an operating system.

3. A computer system according to claim 1 and further comprising:

a first memory device coupled to said processor subsystem;

wherein said emulation code is stored in said first memory device.

4. A computer system according to claim 3 wherein said first memory device is a main memory of said computer system.

5. A computer system according to claim 1 and further comprising:

a first, initially enabled, data path which couples said software application and said processor subsystem;

a second, initially disabled, data path which couples said circuit and said processor subsystem; and means for disabling said first data path and enabling said second data path if said series of instructions include at least one instruction which cannot be recognized by said processor subsystem.

13

6. A computer system, comprising:
a processor subsystem configured to recognize a first set of instructions;
a software application comprised of a series of instructions, said series of instructions including at least one instruction which cannot be recognized by said processor subsystem;
means for propagating said series of instructions comprising said software application to said processor subsystem for execution;
a first memory device coupled to said processor subsystem;
a circuit, coupled to said processor subsystem, for propagating emulation code, recognizable by said processor subsystem and stored in said first memory device, in place of said at least one instruction;
wherein said circuit further comprises:
a second memory device in which first, second and third blocks of data are stored for each of said at least one instruction which cannot be recognized by said processor subsystem;
wherein said first data block uniquely identifies an instruction which cannot be recognized by said processor subsystem, said second data block provides a location within said first memory device and said third data block provides a data length.

7. A computer system according to claim 6 wherein said circuit further comprises:
a comparator, coupled to said second memory device, for comparing at least one of said series of instructions with each one of said first data blocks;
said circuit propagating a portion of said emulation code stored in said first memory device to said processor subsystem if one of said series of instructions matches one of said first data blocks;
wherein a starting address for and a length of said portion of said emulation code propagated to said processor subsystem are respectively contained in said second and third data blocks corresponding to said matching first data block.

8. A computer system according to claim 7 and further comprising:
means for determining when said processor subsystem is ready to receive said series of instruction from said software application; and
means for comparing a first one of said series of instructions to said first data blocks stored in said second memory device.

9. A computer system according to claim 8 wherein said first one of said series of instructions is a CPUID instruction.

10. A computer system according to claim 8 and further comprising:
a first, normally enabled, data path which couples said software application and said processor subsystem;
a second, normally disabled, data path which couples said first memory device with said processor subsystem; and
means for disabling said first data path and enabling said second data path if said first one of said series of instructions matches one of said first data blocks.

11. For a computer system having a processor subsystem, a method for emulating opcode instruction exceptions propagated to said processor subsystem, comprising the steps of:
detecting an instruction being propagated towards said processor subsystem;

14 determining if said instruction is an opcode instruction exception;
identifying an emulation code which corresponds to said detected opcode instruction exception;
preventing arrival of said instruction at said processor subsystem; and
propagating said determined emulation code to said processor subsystem for execution in place of said instruction.

12. For a computer system having a processor subsystem, a method for emulating opcode instructions exceptions propagated to said processor subsystem, comprising the steps of:
detecting an instruction being propagated to said processor subsystem;
comparing an identifying code for said detected instruction to an identifying code for each one of a plurality of potential opcode instruction exceptions;
determining that said detected instruction is an opcode instruction exception if said identifying code for said detected instruction matches said identifying code for one of said plurality of potential opcode instruction exceptions;
identifying an emulation code which corresponds to said detected opcode instruction exception; and
propagating said determined emulation code to said processor subsystem for execution.

13. A method for emulating opcode instruction exceptions according to claim 11, and further comprising the steps of:
providing a first, initially enabled, data path along which instructions are propagated to said processor subsystem; and
providing a second, initially disabled, data path along which emulation codes are propagated to said processor subsystem.

14. A method for emulating opcode instruction exceptions according to claim 13 and further comprising the steps of:
disabling said first data path to interrupt propagation of said detected instruction to said processor subsystem and enabling said second data path upon determining that said detected instruction is an opcode instruction exception; and
propagating said determined emulation code to said processor subsystem along said second data path.

15. For a computer system having a processor subsystem, a method for emulating opcode instruction exceptions propagated to said processor subsystem, comprising the steps of:
detecting an instruction being propagated to said processor subsystem;
determining a plurality of potential opcode instruction exceptions for said processor subsystem;
storing an identifying code for each one of said plurality of determined potential opcode instruction exceptions;
comparing an identifying code for said detected instruction to said identifying code for each one of said plurality determined potential opcode instruction exceptions;
determining that said detected instruction is an opcode instruction exception if said identifying code for said detected instruction matches said identifying code for one of said plurality of determined potential opcode instruction exceptions:
identifying an emulation code which corresponds to said detected opcode instruction exception; and propagating said determined emulation code to said processor subsystem for execution.

16. A method for emulating opcode instruction exceptions according to claim 15 wherein said identifying code for said detected instruction is a header portion of said detected instruction.

17. A method for emulating opcode instruction exceptions according to claim 15 wherein said identifying code for said detected instruction is a CPUID instruction.

18. A method for emulating opcode instruction exceptions according to claim 15 and further comprising the steps of:
   providing a first, normally enabled, data path along which instructions are propagated to said processor subsystem; and
   providing a second, normally disabled, data path along which emulation codes are propagated to said processor subsystem.

19. A method for emulating opcode instruction exceptions according to claim 18 and further comprising the steps of:
   disabling said first data path and enabling said second data path upon determining that said detected instruction is an opcode instruction exception; and
   propagating said determined emulation code to said processor subsystem along said second data path.

20. For a computer system having a processor subsystem, a method for emulating opcode instruction exceptions propagated to said processor subsystem, comprising the steps of:
   determining a plurality of potential opcode instruction exceptions for said processor subsystem;
   storing an identifying code for each one of said plurality of determined potential opcode instruction exceptions at a first location;
   storing an emulation code for each one of said plurality of determined potential opcode instruction exceptions at a second location;
   detecting an instruction being propagated to said processor subsystem, said instruction comprised of at least one byte of data;
   comparing an identifying code for said detected instruction to said identifying code for each one of said plurality of determined potential opcode instruction exceptions;
   determining that said detected instruction is an opcode instruction exception if said identifying code for said detected instruction matches said identifying code for one of said plurality of determined potential opcode instruction exceptions;
   identifying said emulation code which corresponds to said detected opcode instruction exception; and
   propagating said identified emulation code to said processor subsystem for execution.

21. A method for emulating opcode instruction exceptions according to claim 20 and further comprising the steps of:
   monitoring at least one output line of said processor subsystem;
   determining, based upon the state of said at least one output line, that said processor subsystem is to receive an instruction; and
   upon determining that said processor subsystem is to receive an instruction, comparing a first byte of said detected instruction to said identifying code for each one of said plurality of determined potential opcode instruction exceptions.

22. A method for emulating opcode instruction exceptions according to claim 21 and further comprising the steps of:
   providing a first, normally enabled, data path along which instructions are propagated to said processor subsystem;
   providing a second, normally disabled, data path along which emulation codes are propagated to said processor subsystem;
   disabling said first data path and enabling said second data path if said first byte of said detected instruction matches said identifying code for one of said plurality of determined potential opcode instruction exceptions; and
   maintaining enablement of said first data path and disablement of said second data path if said first byte of said detected instruction fails to match said identifying code for one of said plurality of determined potential opcode instruction exceptions.

23. A method for emulating opcode instruction exceptions according to claim 22 wherein the step of storing an identifying code for each one of said plurality of determined potential opcode instruction exceptions at a first location further comprising the step of further storing, at said first location, an address and a byte size for each one of said plurality of determined potential opcode instruction exceptions.

24. A method for emulating opcode instruction exceptions according to claim 23 and further comprising the steps of:
   pointing to a first byte of said identified emulation code using said address corresponding to said matched identifying code;
   propagating said first byte to said processor subsystem;
   decrementing said byte size by one;
   repeating the steps of pointing to a next, successive, byte of said identified emulation code, propagating a next byte to said processor subsystem and decrementing said byte size by one until said byte size is decremented to zero; and
   informing said processor subsystem that propagation of said identified emulation code is complete.

25. A method for emulating opcode instruction exceptions according to claim 24 and further comprising the step of, upon decrementing said byte size to zero, enabling said first data path and disabling said second data path.

26. A computer system capable of processing instructions unrecognizable by a processor subsystem thereof, comprising:
   a local bus;
   a processor subsystem coupled to said local bus, said processor subsystem capable of recognizing a set of instructions;
   a memory device coupled to said local bus;
   a system bus; and
   an opcode exception emulator, coupled to said system bus, for detecting instructions, prior to placement on said local bus by said system bus for propagation to said processor subsystem, which are not included in said set of instructions which can be recognized by said processor subsystem and locating corresponding emulation codes stored in said memory device for transfer to said processor subsystem in place of said detected instructions;
   said emulation codes included in said set of instructions which can be recognized by said processor subsystem.

27. A computer system capable of processing instructions unrecognizable by a processor subsystem thereof, comprising:

a local bus;

a processor subsystem coupled to said local bus, said processor subsystem capable of recognizing a set of instructions;

a memory device coupled to said local bus;

a system bus;

an opcode exception emulator, coupled to said system bus, for detecting instructions to be placed on said local bus by said system bus and not included in said set of instructions which can be recognized by said processor subsystem and locating corresponding emulation codes stored in said memory device for transfer to said processor subsystem in place of said detected instructions;

said emulation codes included in said set of instructions which can be recognized by said processor subsystem;

wherein said opcode exception emulator further comprises:

memory means for storing a plurality of instructions not included in said set of instructions; and a comparator circuit, coupled to said memory means, said comparator circuit comparing instructions to be placed on said local bus with said plurality of instructions stored in said memory means;

said comparator circuit determining that an instruction to be placed on said local bus is not recognizable by said processor subsystem if said instruction matches one of said plurality of instructions stored in said memory means.

28. A computer system according to claim 27 wherein said computer system further comprises:

a first, normally enabled, buffer which couples said system bus to said local bus;

a second buffer which couples said system bus to said opcode emulation device; and a third, normally disabled, buffer which couples said memory device to said local bus.

29. A computer system according to claim 28 wherein said opcode emulation device further comprises a controller circuit, coupled to said comparator circuit, said first buffer and said third buffer, said controller circuit disabling said first buffer and enabling said third buffer upon said comparator circuit determining that said instruction to be placed on said local bus is not recognizable by said processor subsystem.

30. A computer system according to claim 29 wherein said opcode exception emulation device further comprises pointing means for pointing to an emulation code stored in said memory device to be propagated to said processor subsystem, said emulation code corresponding to said instruction determined by said comparator circuit as not recognizable by said processor subsystem.

* * * * *